US010823150B2

(12) United States Patent
Wang et al.

(10) Patent No.: US 10,823,150 B2
(45) Date of Patent: Nov. 3, 2020

(54) CONNECTING STRUCTURE FOR STEEL TUBE TRUSS AND TOWER BARREL OF LATTICE WIND POWER GENERATION TOWER, PRESTRESSED POLYGON WIND TOWER PROVIDED WITH CIRCULAR BOX GIRDER FOR DIRECT FAN ON TOP OF TOWER, WIND POWER GENERATION TOWER, AND WIND TOWER HAVING PRESTRESSED ANTI-FATIGUE STRUCTURE

(71) Applicant: Qingdao Hua-strong Energy Technology Co., Ltd., Shandong (CN)

(72) Inventors: Tonghua Wang, Shandong (CN); Zhaohua LV, Shandong (CN)

(73) Assignee: QINDAO HUA-STRONG ENERGY TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 16/309,005

(22) PCT Filed: Mar. 2, 2018

(86) PCT No.: PCT/CN2018/077822
§ 371 (c)(1),
(2) Date: Dec. 11, 2018

(87) PCT Pub. No.: WO2018/157849
PCT Pub. Date: Sep. 7, 2018

(65) Prior Publication Data
US 2019/0309731 A1    Oct. 10, 2019

(30) Foreign Application Priority Data

Mar. 3, 2017   (CN) .................... 2017 2 0203329 U
Apr. 1, 2017   (CN) ......................... 2017 1 0212768
(Continued)

(51) Int. Cl.
*E04H 12/10*   (2006.01)
*E04H 12/16*   (2006.01)
*F03D 13/20*   (2016.01)

(52) U.S. Cl.
CPC ............. *F03D 13/20* (2016.05); *E04H 12/10* (2013.01); *E04H 12/16* (2013.01); *F05B 2240/9121* (2013.01); *Y02E 10/728* (2013.01)

(58) Field of Classification Search
CPC ......... F03D 13/20; E04H 12/10; E04H 12/16; F05B 2240/9121
See application file for complete search history.

(56) References Cited

U.S. PATENT DOCUMENTS 7,276,808 B2 * 10/2007 Weitkamp ............... F03D 80/85
290/55
10,001,111 B2 * 6/2018 Patberg .................... E04H 12/34
(Continued)

FOREIGN PATENT DOCUMENTS

CN     103899499    7/2014
CN     205046924    2/2016
(Continued)

OTHER PUBLICATIONS

"Communication pursuant to Article 94(3) EPC" dated Sep. 6, 2019 issued in EP Application No. 18 760 920.1-1002.
(Continued)

*Primary Examiner* — Paola Agudelo
(74) *Attorney, Agent, or Firm* — Warner Norcross + Judd LLP

(57) ABSTRACT

A connecting structure for a steel tube truss and a tower barrel of a lattice wind power generation tower, a prestressed polygon wind tower provided with a circular box girder for a direct fan on the top of the tower, a wind power generation tower, and a wind tower having a prestressed anti-fatigue
(Continued)

structure, which relate to the technical field of wind power generation towers, can simplify the connection mode between the tower barrel and the lattice tower frame, resolve the stress problem, enable the force transmission of a transition section to be direct and save materials.

17 Claims, 13 Drawing Sheets

(30) Foreign Application Priority Data

May 4, 2017 (CN) .......................... 2017 1 0306188
Oct. 26, 2017 (CN) ..................... 2017 2 1395756 U

(56) References Cited

U.S. PATENT DOCUMENTS

| 2008/0028715 | A1* | 2/2008 | Foss | E02B 17/0004 |
| | | | | 52/651.01 |
| 2011/0138721 | A1* | 6/2011 | Bagepalli | E02D 27/42 |
| | | | | 52/299 |
| 2011/0265419 | A1* | 11/2011 | De Abreu | E04H 12/10 |
| | | | | 52/651.01 |
| 2012/0023860 | A1* | 2/2012 | Voss | F03D 13/20 |
| | | | | 52/651.09 |
| 2014/0075864 | A1* | 3/2014 | Foss | E02B 17/0004 |
| | | | | 52/223.4 |
| 2014/0345218 | A1* | 11/2014 | Larsen | E02D 27/425 |
| | | | | 52/299 |
| 2017/0298647 | A1* | 10/2017 | Bartminn | E04H 12/10 |
| 2017/0321659 | A1* | 11/2017 | V | E04H 12/10 |

FOREIGN PATENT DOCUMENTS

| CN | 105971827 | 9/2016 |
| CN | 106321367 | 1/2017 |
| CN | 106836937 | 6/2017 |
| CN | 106979131 | 7/2017 |
| CN | 206707382 | 12/2017 |
| CN | 206707932 | 12/2017 |
| CN | 206917806 | 1/2018 |
| DE | 102005017162 | 10/2006 |
| DE | 102005047961 | 4/2007 |
| DE | 102006056274 | 5/2008 |
| EP | 1729007 | 12/2006 |
| EP | 2592199 | 5/2013 |
| EP | 2653715 | 10/2013 |

OTHER PUBLICATIONS

International Search Report and Written Opinion from PCT/CN2018/077822 dated Jun. 1, 2018.

\* cited by examiner

CONNECTING STRUCTURE FOR STEEL TUBE TRUSS AND TOWER BARREL OF LATTICE WIND POWER GENERATION TOWER, PRESTRESSED POLYGON WIND TOWER PROVIDED WITH CIRCULAR BOX GIRDER FOR DIRECT FAN ON TOP OF TOWER, WIND POWER GENERATION TOWER, AND WIND TOWER HAVING PRESTRESSED ANTI-FATIGUE STRUCTURE

TECHNICAL FIELD

The present disclosure relates to the technical field of wind power generation towers, to be more specific, relates to a connecting structure for a steel tube truss and a tower barrel of a lattice wind power generation tower, a prestressed polygon wind tower provided with a direct-fan circular box girder on the top of the tower, a wind power generation tower, and a wind tower having a prestressed anti-fatigue structure.

BACKGROUND OF THE INVENTION

Wind power generation technology, which requires fuel and a small occupied area and is clean and environmentally friendly, has increasingly become a key development field of the country. As a generator support member, the wind power generation tower frame needs to be light and stable, which can ensure a strong carrying capacity and take into account economic costs.

For the lattice wind power generation tower frame, the transition section connecting the lattice steel tube truss and the fan tower barrel is an important structure, which suffers from large action force and has concentrated force positions, therefore, in the design of the lattice wind tower, the connecting transition of the steel tube truss to the fan tower barrel is a difficult point in the design of the lattice wind tower. The inventors found in the research that the connecting transition of the conventional steel tube truss to the fan tower barrel has at least the following disadvantages: 1. the connection mode and the connection relationship are complicated, resulting in waste of the manufacturing materials; and 2. the ability to withstand stress at the connection position is poor, causing that breakage accidents easily occur.

SUMMARY OF THE INVENTION

The object of the present disclosure includes providing a connecting structure for a steel tube truss and a tower barrel of a lattice wind power generation tower, which improves the deficiencies of the prior art, can simplify the connection mode between the tower barrel and the lattice tower frame, resolve the stress problem, enable the force transmission of a transition section to be direct and save materials.

The object of the present disclosure also includes providing a prestressed polygon wind tower provided with a direct-fan circular box girder on the top of the tower, which has all the characteristics of the connecting structure of the steel tube truss and the tower barrel of the lattice wind power generation tower, can be convenient for the connection between the tower body and the engine room, simplify the connection mode of the transition portion, reduce the amount of material used, and transmit the force directly.

The object of the present disclosure also includes providing a wind power generation tower having all the characteristics of the connecting structure of the steel tube truss and the tower barrel of the lattice wind power generation tower, which can adapt to the running space requirement of a blade, simplify the manufacturing and installation steps, reduce costs and increase production efficiency.

The object of the present disclosure also includes providing a wind tower having a prestressed anti-fatigue structure, with the wind tower having all the characteristics of the connecting structure of the steel tube truss and the tower barrel of the lattice wind power generation tower, and capable of enhancing the utilization rate of materials, prolonging fatigue life and being easy to construct.

To achieve at least one of the objects of the present disclosure, the present disclosure is implemented as follows.

In one aspect, the present disclosure provides a connecting structure of a steel tube truss and a tower barrel of a lattice wind power generation tower, wherein the steel tube truss and the tower barrel are connected through a transition section; said steel tube truss has a plurality of steel tube tower pillars, the upper end portion of each of the steel tube tower pillars has a U-shaped groove, the barrel wall of the transition section is inserted into the U-shaped groove and fixedly connected with the steel tube tower pillars by butt welds; a pore remains at the lower end portion of the U-shaped groove; and the barrel wall of the transition section has a semi-circular groove between every two steel tube tower pillars.

Specifically, said steel tube truss comprises steel tube tower pillars, cross bars and diagonal bars, there are n steel tube tower pillars, which are connected with each other by the cross bars in the horizontal direction and have lateral faces connected by the diagonal bars, constituting a steel-structure lattice tower body with a cross section being in a shape of n-regular polygon, wherein n is an integer greater than or equal to 4.

In another aspect, a prestressed polygon wind tower provided with a direct-fan circular box girder on the top of the tower is also provided, which comprises a steel-structure lattice tower body, a fan-engine-room connection flange and the circular box girder, wherein said circular box girder is connected to the top of the steel-structure lattice tower body, said steel-structure lattice tower body comprises tower pillars, cross bars, diagonal bars, each of said tower pillars is provided therein with a prestressed steel strand, said circular box girder comprises the upper flange of the circular box girder, the web plate of the circular box girder, the lower flange of the circular box girder, a ring-girder bottom flange, wherein the prestressed steel strands inside said tower pillars are anchored on the upper flange of the circular box girder, and said fan-engine-room connection flange is connected with the circular box girder.

Specifically, said tower pillar is a steel tube, said cross bar and diagonal bar can be made of a profile steel or a double C-type section steel formed by bending.

Optionally, said fan-engine-room connection flange is connected to the circular box girder through a first bolt A, which is at the inner side of the upper flange of the circular box girder.

Optionally, the top of said tower pillar is provided with a tower-pillar top flange, said lower flange of the circular box girder is provided with a ring-girder bottom flange, and said tower-pillar top flange is connected to the ring-girder bottom flange through a second bolt B.

In another aspect, a wind power generation tower is also provided, which comprises a tower frame and a tower barrel disposed above the tower frame, wherein the tower frame and the tower barrel are connected with each other by a circular box girder.

Specifically, the tower frame includes prestressed tower pillars; and the bottom of the circular box girder is connected to the prestressed tower pillars through a pillar top flange.

Optionally, prestressed steel strands are disposed inside and pass through the prestressed tower pillar.

Optionally, the prestressed steel strands pass through the circular box girder and an inverted T-type flange.

Specifically, the inverted T-type flange and the circular box girder are connected with each other by a bolt which passes through the circular box girder.

Optionally, the tower frame further comprises diagonal bars and cross bars respectively connected to the prestressed tower pillar.

Optionally, a transition portion is connected between the tower barrel and the circular box girder.

Optionally, the transition portion is connected to the circular box girder through the inverted T-shaped flange.

Optionally, the bottom of the tower barrel is connected to the transition portion through a bottom flange.

Specifically, the transition portion is divided into the fragments by a longitudinal flange.

In another aspect, a wind tower having a prestressed anti-fatigue structure is also provided, comprising a tower barrel, a transition structure, a framed tower frame, and a base fixing device, wherein said tower barrel is fixed within the transition structure, said transition structure is located at the top of the framed tower frame, said framed tower frame is mounted on the base fixing device, wherein said framed tower frame comprises tower pillars, prestressed steel strands, diagonal bars, cross bars, cross sills, subdivided web rods and subdivided cross sills, the bottom end of each tower pillar is fixed in the base fixing device by a prestressed anchor bolt, said prestressed steel strand penetrates from the bottom of the tower pillar to the top thereof, the top end of the prestressed steel strand is tensioned and fixed to the top of the tower pillar, the bottom end of the prestressed steel strand is anchored in a cable anchor fixation section in the base fixing device; said diagonal bars are crosswise fixed to the tower pillars through gusset plates (joint plates) and bolts, said cross bars are horizontally fixed to the tower pillars through gusset plates and bolts; said cross sills are fixed to the cross bars through gusset plates and the bolts; and subdivided web rods are installed between said diagonal bars and the cross bars, and subdivided cross sills are installed between said cross bars and the cross sills.

In conclusion, compared to the prior art, the beneficial effect of the present disclosure include at least:

simplifying the connection mode between the tower barrel and the lattice tower frame, resolving the stress problem, enabling the force transmission of a transition section to be direct and saving materials; adapting to the running space requirement of the blade, simplifying the manufacturing and installation steps, reducing costs and increasing production efficiency; and prolonging fatigue life, and being convenient to construct.

BRIEF DESCRIPTION OF THE DRAWINGS

In order to illustrate the technical solutions of the embodiments of the present disclosure more clearly, the accompanying drawings required to be used in the embodiments will be briefly introduced below, it should be understood that the following accompanying drawings show only certain embodiments of the present disclosure, thus it should not be seen as a limitation to the scope. To those ordinary skilled in the art, other related accompanying drawings can also be obtained according to these accompanying drawings, under the premise of doing no creative work.

Figure 1:
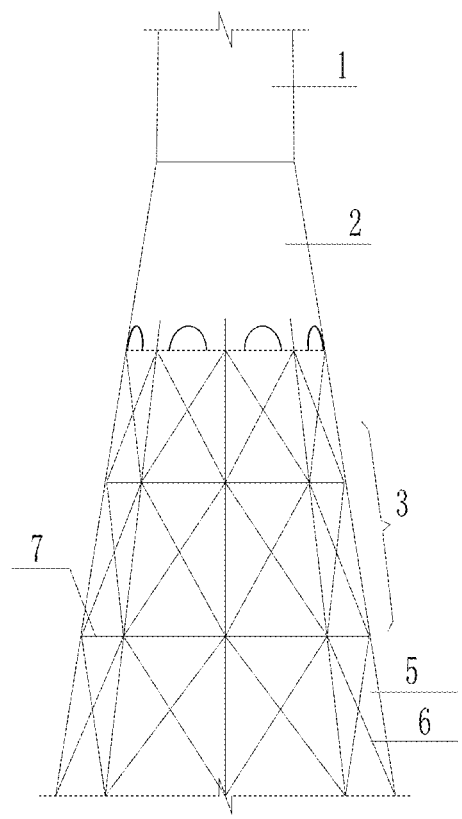
FIG. 1 is a structural schematic view of a connecting structure for a steel tube truss and a tower barrel of a lattice wind power generation tower, applied to a lattice wind tower, provided by an embodiment of the present disclosure.

Reference signs: 1—tower barrel; 2—transition section; 3—steel-structure lattice tower body; 4—semi-circular groove; 5—steel tube tower pillar; 6—diagonal bar; 7—cross bar; 8—pore; 9—butt weld; 10—U-type groove; 11—barrel wall of the transition section; 12—steel-structure lattice tower body; 13—circular box girder; 14—tower pillar; 15—cross bar; 16—diagonal bar; 17—prestressed steel strand; 18—upper flange of the circular box girder; 19—first bolt A; 20—ring-girder bottom flange; 21—second bolt B; 22—lower flange of the circular box girder; 23—web plate of the circular box girder; 24—tower-pillar top flange; 25—fan-engine-room connection flange; 26—tower barrel; 27—circular box girder; 28—prestressed tower pillar; 29—pillar top flange; 30—prestressed steel strand; 31—inverted T-type flange; 32—bolt; 33—diagonal bar; 34—cross bar; 35—transition portion; 36—bottom flange; 37—longitudinal flange; 38—framed tower frame; 39—prestressed steel strand; 40—diagonal bar; 41—cross bar; 42—tower barrel; 43—transition structure; 44—gusset plate; 45—bolt; 46—cross sill; 47—base fixing device; 48—tower pillar; 49—subdivided web rod; 50—subdivided cross sill; 51—cable anchor fixation section; 52—prestressed anchor bolt.

DESCRIPTION OF THE CURRENT EMBODIMENTS

In order to make the objects, technical solutions and advantages of the embodiments of the present disclosure clearer, the technical solutions in the embodiments of the present disclosure are clearly and completely described below in combination with the accompanying drawings in the embodiments of the present disclosure. Obviously, the embodiments described are part of the embodiments of the present disclosure, but not all of the embodiments. The components in the embodiments of the present disclosure, which are described and illustrated in the accompanying drawings herein, may generally be arranged and designed in various different configurations.

Therefore, the following detailed description for the embodiments of the present disclosure provided in the accompanying drawings is not intended to limit the scope of the present disclosure claimed to be protected, but to represent only the selected embodiments of the present disclosure. Based on the embodiments in the present disclosure, all other embodiments obtained by those ordinary skilled in the art under the premise of doing no creative work fall within the protection scope of the present disclosure.

It should be noted that similar reference numerals and letters indicate similar items in the following accompanying drawings. Therefore, once a certain item is defined in one accompanying drawing, it is not necessary to further define and explain it in the subsequent accompanying drawings.

In the description of the present disclosure, it should be illustrated that the orientation or position relationship indicated by the terms "center", "upper", "lower", "left", "right", "vertical", "horizontal", "inside", "outside", etc. is based on the orientation or position relationship shown in the accompanying drawings, or the orientation or position relationship that is conventionally placed when the inventive product is used, which is only for the convenience of describing the present disclosure and simplifying the description, rather than indicating or implying that the device or element indicated must have a particular orientation, is constructed and operated in a particular orientation, and thus is not to be understood as a limitation on the present disclosure. Moreover, the terms "first," "second," "third," etc. are used merely to distinguish the description, and are not to be understood as indicating or implying importance in relativity.

Moreover, the terms "horizontal", "vertical", "overhanging", and the like do not mean that the parts are required to be absolutely horizontal or overhanging, but may be slightly inclined. For example, "horizontal" simply means that its direction is more horizontal than "vertical", and does not mean that this structure must be completely horizontal, but may be slightly inclined.

In the description of the present disclosure, it should be further illustrated that, unless otherwise specifically regulated and defined, the terms "set", "install", "link", and "connect" should be a generalized understanding, for example, which may be a fixed connection, may also be a detachable connection, or an integrated connection; may be a mechanical connection, may also be an electrical connection; may be linked directly, may also be linked indirectly through an intermediate medium, and may be an internal connection between two elements. For those ordinary skilled in the art, the specific meanings of the aforementioned terms in the present disclosure can be understood in the specific situations.

Embodiment 1

Figure 2:
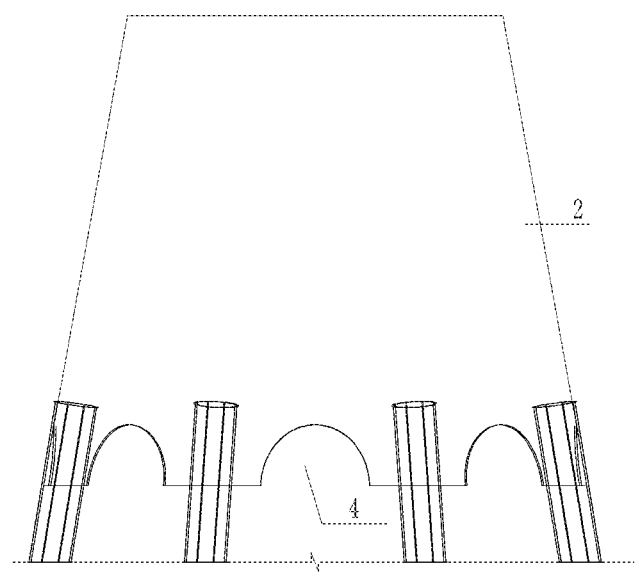
FIG. 2 is a structural schematic view showing connection between a transition section and tower pillars of a steel tube truss.
Figure 3:
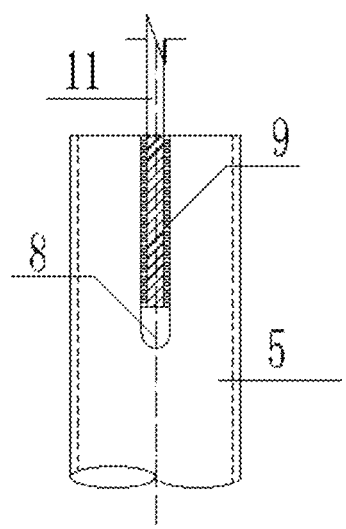
FIG. 3 shows connection form of a tower pillar of a steel tube truss and a barrel wall of a transition section.
Figure 4:
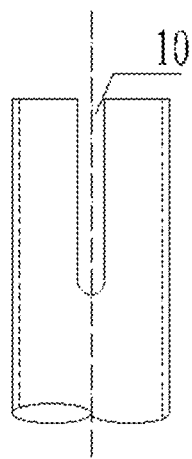
FIG. 4 shows a form of a U-shaped groove of a tower pillar of a steel tube truss.

The wind power generation tower as shown in FIG. 1 comprises a steel-structure lattice tower body 3 with a cross section in a shape of n-regular polygon, a tower barrel 1 and a transition section 2. The lattice tower body 3 is a steel tube truss constituted by n steel tube tower pillars 5, cross bars 7 and diagonal bars 6, with the steel tube truss connected to the tower barrel 1 by the transition section 2. FIG. 2 shows the connection part between the transition section 2 and the steel tube tower pillars 5. A U-type groove 10 (as shown in FIG. 4) is provided at the upper end portion of the steel tube tower pillar 5, and the barrel wall 11 of the transition section is inserted into the U-shaped groove 10. As shown in FIG. 3, the steel tube tower pillar 5 is connected with the barrel wall 11 of the transition section by a butt weld 9, with a pore 8 remaining at the end portion of the U-type groove 10. The transition section 2 is provided with a semi-circular groove 4 between every two steel tube tower pillars 5 (see FIG. 2).

It should be illustrated that the steel-structure lattice tower body 3 is arranged to have a cross section in a shape of n-regular polygon, to thereby ensure the structure and force stability in each direction of the sides of the steel-structure lattice tower body 3, and reduce the risk of rollover.

Specifically, as shown in FIG. 1, said steel tube truss comprises steel tube tower pillars 5, cross bars 7 and diagonal bars 6. There are n steel tube tower pillars 5, which are connected with each other by the cross bars 7 in the horizontal direction and have lateral faces connected by the diagonal bars 6, constituting the steel-structure lattice tower body 3 with a cross section being in a shape of n-regular polygon, wherein n is an integer greater than or equal to 4.

Optionally, integer n is set to be a number from 4 to 8. On the one hand, if the set number n of the steel tube tower pillars 5 is less than 4, it is easy to cause reduced stability of the wind power generation tower using the connecting structure for the tower barrel 1 and the steel-structure lattice tower body 3 of the present disclosure, thus it is difficult to withstand the impact of the wind power from various directions. On the other hand, if the set number n of the steel tube tower pillars 5 is greater than 8, it is easy to make the structure relationship of the wind power generation tower complicated, resulting in the waste of the manufacturing materials.

The type and use of the wind power generation tower in the embodiments of the present disclosure are not specifically limited, as long as it is a steel-structure lattice power generation tower.

Embodiment 2

The present embodiment is a prestressed polygon wind tower provided with a direct-fan circular box girder on the top of the tower, having all the characteristics of the connecting structure of the steel tube truss and the tower barrel of the lattice wind power generation tower. The connecting structure having the steel tube truss and the tower barrel of the lattice wind power generation tower described in Embodiment 1 is also applicable to the present embodiment, and the technical solutions already disclosed in Embodiment 1 are not repeatedly described.

Figure 5:
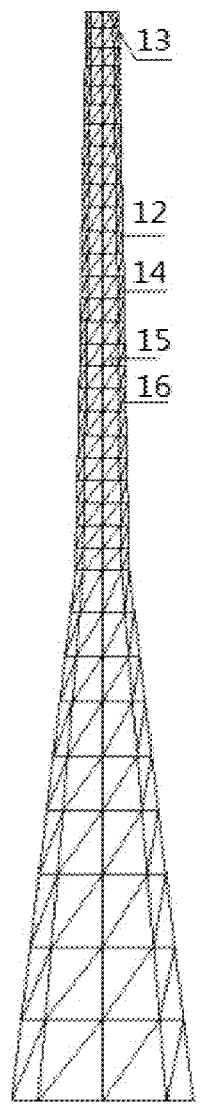
FIG. 5 is a structural schematic view of a prestressed polygon wind tower provided with a direct-fan circular box girder on the top of the tower, provided by an embodiment of the present disclosure.
Figure 6:
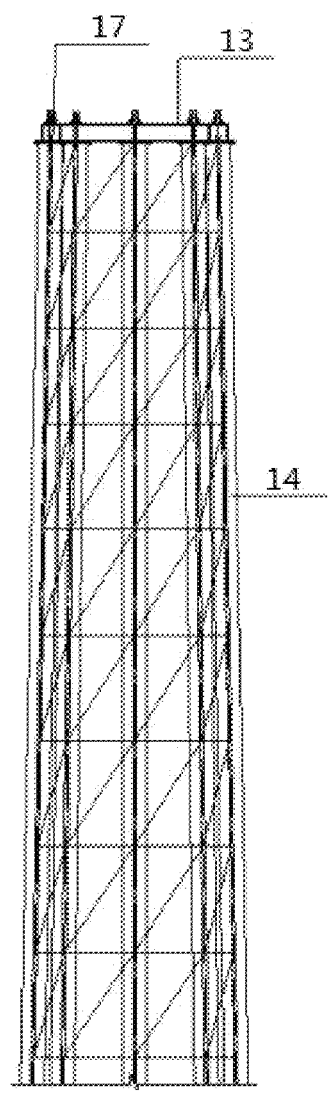
FIG. 6 is a structural schematic view of the top of a steel-structure lattice tower body.
Figure 7:
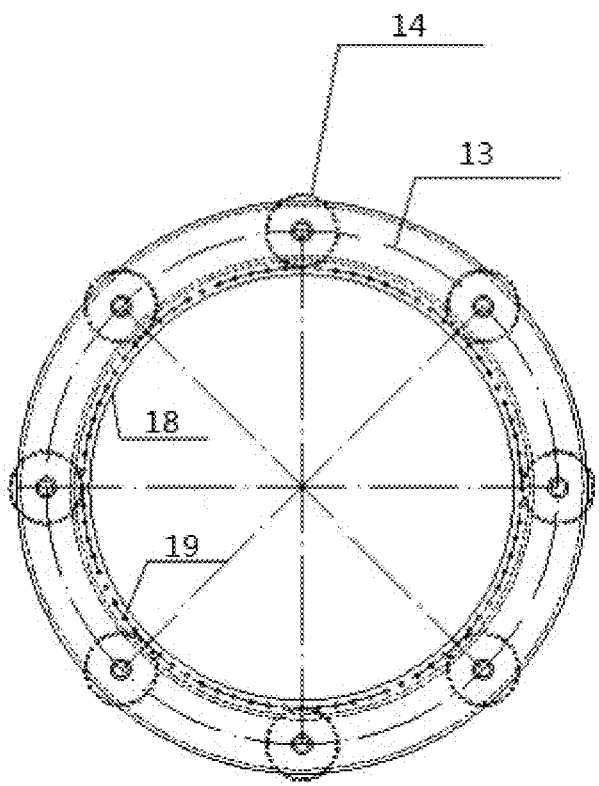
FIG. 7 is a plan view of the upper surface of a circular box girder.
Figure 8:
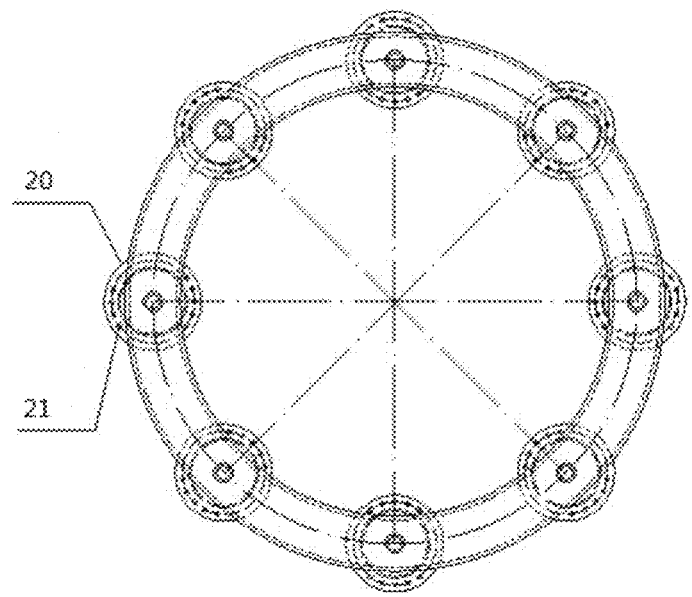
FIG. 8 is a schematic plan view of connecting structure of the circular box girder and the tower-pillar top flange.
Figure 9:
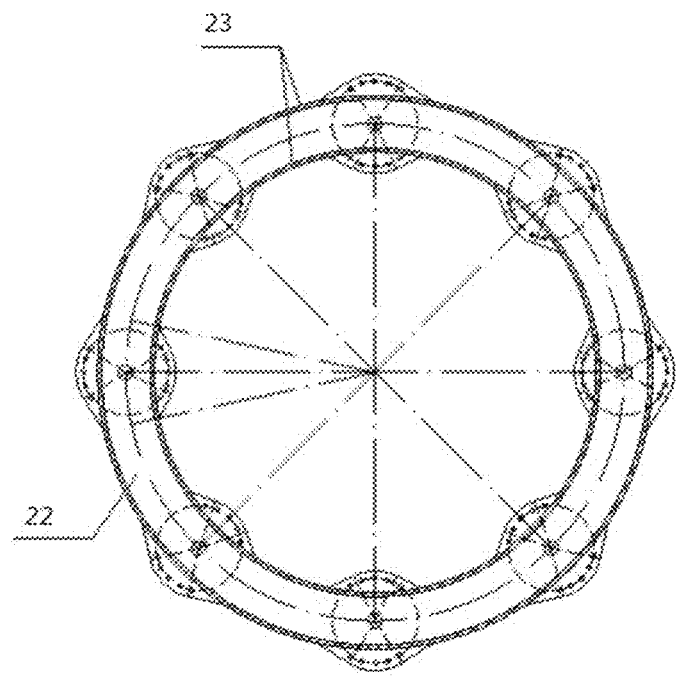
FIG. 9 is a plan view of the lower surface of a circular box girder.
Figure 10:
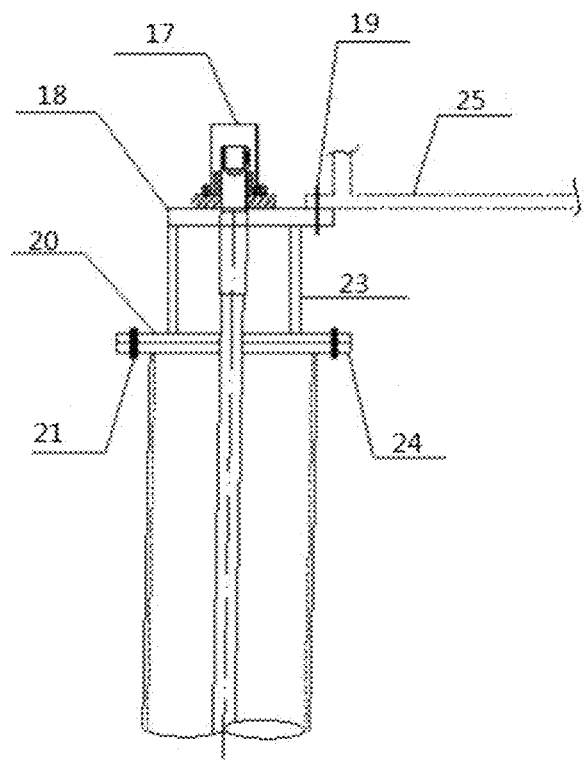
FIG. 10 is a schematic view of connecting structure of the circular box girder and the top of the steel-structure lattice tower body.

Specifically, the difference between the present embodiment and Embodiment 1 is that the present embodiment is a prestressed polygon wind tower provided with a direct-fan circular box girder on the top of the tower. Referring to FIG. 5-FIG. 10, the prestressed polygon wind tower provided with a direct-fan circular box girder on the top of the tower in the present embodiment, as shown in FIG. 5, comprises a steel-structure lattice tower body 12 (similar to the steel-structure lattice tower body 3) and an circular box girder 13, wherein said circular box girder 13 is connected to the top of the steel-structure lattice tower body 12 (similar to the steel-structure lattice tower body 3), said steel-structure lattice tower body 12 (similar to the steel-structure lattice tower body 3) comprises tower pillars 14 (similar to the steel tube tower pillar 5), cross bars 15 and diagonal bars 16, and as shown in FIG. 10, also comprises a fan-engine-room connection flange 25. As shown in FIG. 6, said tower pillar 14 (similar to the steel tube tower pillar 5) is provided therein with a prestressed steel strand 17. As shown in FIG. 7, said circular box girder 13 comprises an upper flange 18 of the circular box girder. As shown in FIG. 9, the circular box girder 13 comprises a web plate 23 of the circular box girder and a lower flange 22 of the circular box girder. As shown in FIG. 8, the circular box girder 13 further comprises a ring-girder bottom flange 20. As shown in FIG. 10, the internal prestressed steel strand 17 of said tower pillar 14 (similar to the steel tube tower pillar 5) is anchored on the upper flange 18 of the circular box girder, and said fan-engine-room connection flange 25 is connected to the circular box girder 13.

Optionally, said steel-structure lattice tower body is configured as a regular octagonal tower body or a regular hexagonal tower body.

Specifically, said tower pillar 14 (similar to the steel tube tower pillar 5) is a steel tube, and said cross bar 15 and diagonal bar 16 can be made of a profile steel or a double C-type section steel formed by bending.

Specifically, as shown in FIG. 10, said fan-engine-room connection flange 25 is connected to the circular box girder 13 through a first bolt A19, which is at the inner side of the upper flange 18 of circular box girder.

Optionally, as shown in FIG. 10, the top of said tower pillar 14 (similar to the steel tube tower pillar 5) is provided with a tower-pillar top flange 24, said lower flange 22 of the circular box girder is provided with a ring-girder bottom flange 20, and said tower-pillar top flange 24 is connected to the ring-girder bottom flange 20 through a second bolt B21.

The aforementioned prestressed polygon wind tower provided with a direct-fan circular box girder on the top of the tower can be convenient for the connection between the tower body and the engine room, simplifying the connection mode of the transition portion, reducing the amount of material used, and enabling direct force transmission.

Embodiment 3

The present embodiment is a wind power generation tower having all the characteristics of the connecting structure of the steel tube truss and the tower barrel of the lattice wind power generation tower. The connecting structure having the steel tube truss and the tower barrel of the lattice wind power generation tower described in Embodiment 1 is also applicable to the present embodiment, and the technical solutions already disclosed in Embodiment 1 are not repeatedly described.

Figure 11:
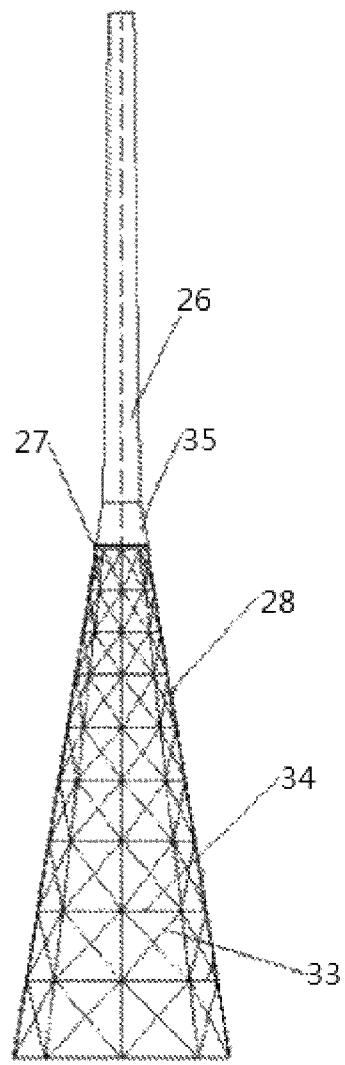
FIG. 11 is a structural schematic view of a wind power generation tower provided by an embodiment of the present disclosure.

Specifically, the difference between the present embodiment and Embodiment 1 is that the present embodiment is a wind power generation tower. Referring to FIG. 11-FIG. 15, a wind power generation tower of the present embodiment, as shown in FIG. 11, comprises a tower frame (similar to the tower pillar 14) and a tower barrel 26 (similar to the tower barrel 1) disposed above the tower frame (similar to the tower pillar 14), wherein the tower frame (similar to the tower pillar 14) and the tower barrel 26 (similar to the tower barrel 1) are connected with each other through a circular box girder 27.

Figure 12:
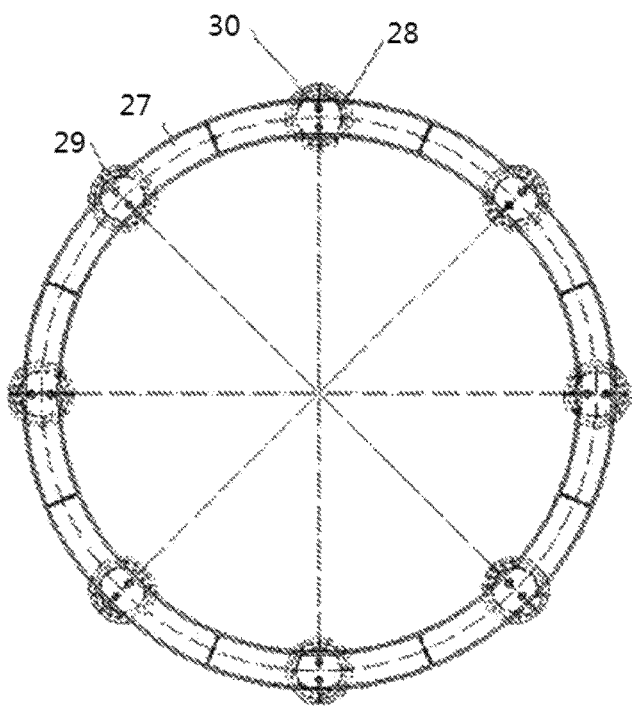
FIG. 12 is a structural schematic view of the lower surface of a circular box girder of a wind power generation tower.

It can be seen that in the wind power generation tower of the present embodiment, a framed tower frame is used at the bottom thereof, and a structure of the tower barrel is arranged in the blade sweeping area of the top thereof. The tower frame and the tower barrel are connected with each other by using the circular box girder, so that it is possible to solve the problems of the dense members in the blade sweeping, the difficulty in manufacture and installation, the increased cost, and the reduced production efficiency. For the wind power generate tower, its structure is reasonable, the installation period is short, it is possible to improve the efficiency, save the on-site labor and conform the concept of the assembled structure, thus improving the utilization rate of materials and simplifying the processes of manufacture and installation under the condition that the edge width of the top of the tower frame is limited Specifically, as shown in FIG. 11, the tower frame (similar to the tower pillar 14) comprises prestressed tower pillars 28. As shown in FIG. 12, the bottom of the circular box girder 27 (similar to the circular box girder 13) is connected to the prestressed tower pillar 28 through the pillar top flange 29. This makes it possible to reinforce the connecting structure between the circular box girder 27 (similar to the circular box girder 13) and the prestressed tower pillar 28.

Optionally, as shown in FIG. 12, the prestressed steel strand 30 (similar to the prestressed steel strand 17) are disposed inside and passes through the prestressed tower pillar 28, which makes it possible to improve the anti-fatigue strength of the prestressed tower pillar 28.

Optionally, as shown in FIG. 2 and referring to FIG. 3-FIG. 5, the prestressed steel strand 30 (similar to the prestressed steel strand 17) passes through the circular box girder 27 (similar to the circular box girder 13) and an inverted T-type flange 31, which enables the stability of the prestressed steel strand 30 (similar to the prestressed steel strand 17) to be better, thereby improving the stability of the prestressed tower pillar 28.

Figure 15:
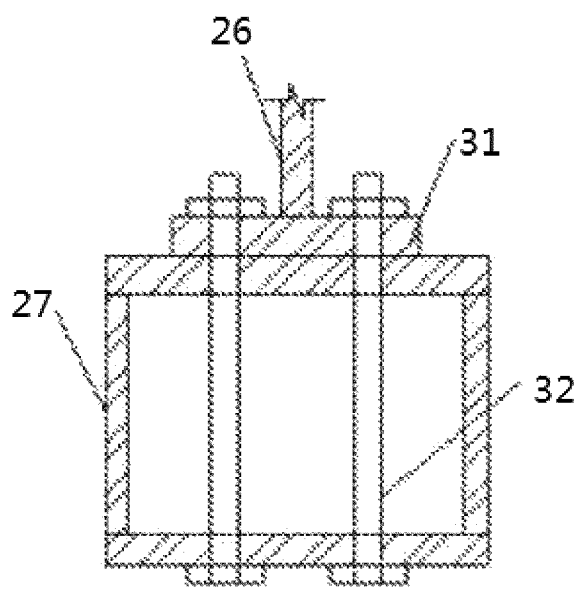
FIG. 15 is a sectional view of a circular box girder of a wind power generation tower.

Specifically, as shown in FIG. 15, the inverted T-type flange 31 and the circular box girder 27 (similar to the circular box girder 13) are connected by a bolt 32 passing through the circular box girder 27 (similar to the circular box girder 13), which enables the fixing structure of the inverted T-type flange 31 to be firmer and more reliable. Optionally, in order to improve the strength, a high-strength bolt may be used as the bolt 32.

Optionally, as shown in FIG. 11, the tower frame (similar to the tower pillar 14) further comprises diagonal bars 33 (similar to the diagonal bar 6 and the diagonal bar 16) and cross bars 34 (similar to the cross bar 7 and the cross bar 15), respectively connected to the prestressed tower pillar 28, which enables the structure of the tower frame to form a stable space truss.

Optionally, as shown in FIG. 11, a transition portion 35 (similar to the transition section 2) is connected between the tower barrel 26 (similar to the tower barrel 1) and the circular box girder 27 (similar to the circular box girder 13), this enables the reasonable connection transition between the tower barrel 26 (similar to the tower barrel 1) and the circular box girder 27 (similar to the circular box girder 13).

Optionally, as shown in FIG. 15 and referring to FIG. 11-14, the transition portion 35 (similar to the transition section 2) and the circular box girder 27 (similar to the circular box girder 13) are connected with each other by the inverted T-shaped flange 31, which enables reliable force transmission between the transition portion 35 (similar to the transition section 2) and the circular box girder 27 (similar to the circular box girder 13).

Figure 13:
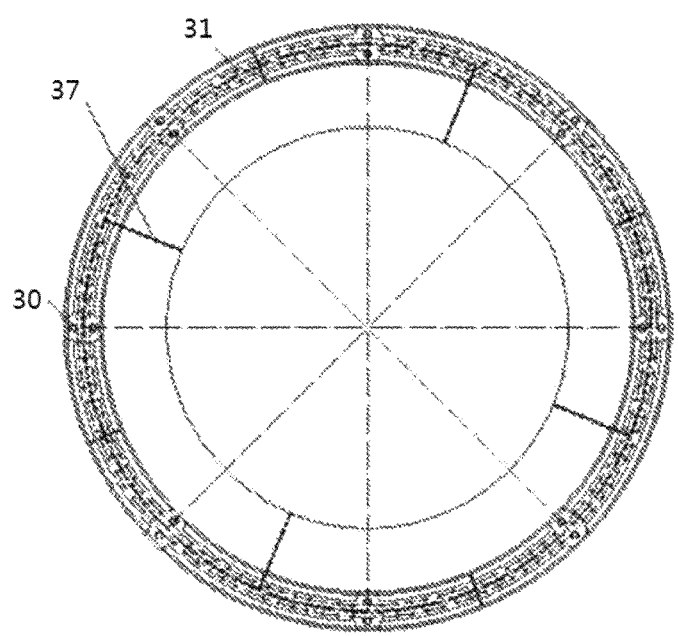
FIG. 13 is a plan view of the upper surface of a circular box girder of a wind power generation tower.
Figure 14:
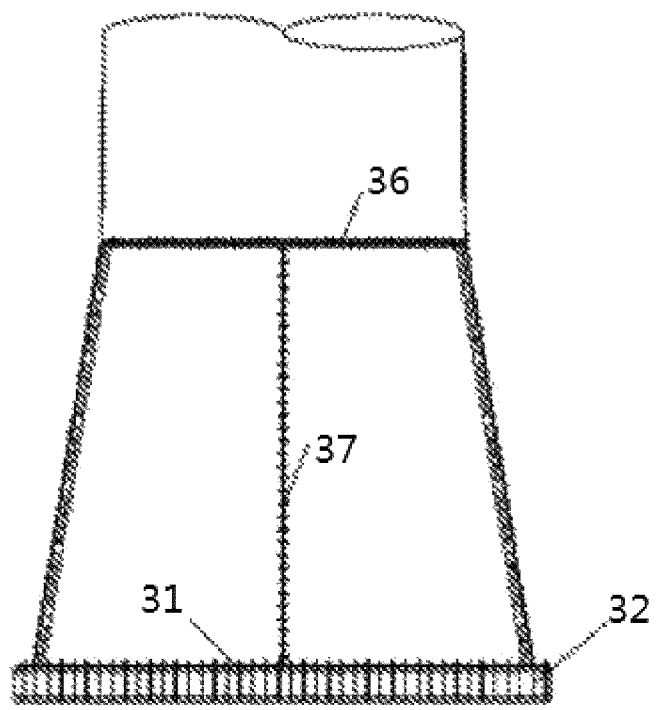
FIG. 14 is an elevation schematic view of the joint where the circular box girder and the transition portion of a wind power generation tower is connected.

Optionally, as shown in FIG. 11, and referring to FIG. 12-14, the bottom of the tower barrel 26 (similar to the tower barrel 1) is connected to the transition portion 35 (similar to the transition section 2) by a bottom flange 36, enabling the bottom of the tower barrel 26 (similar to the tower barrel 1) is connected to the transition portion 35 (similar to the transition section 2) more firmly.

Specifically, as shown in FIG. 13, the transition portion 35 (similar to the transition section 2) is divided into the fragments by a longitudinal flange 37, which is able to solve the transportation problem of the transition portion 35 (similar to the transition section 2).

In addition, in the wind power generation tower of the present embodiment, its tower frame may be an N-regular-polygon tower frame, N=4~12. The prestressed tower pillar may be a steel tube pillar. The cross bar and the diagonal bar may be made of a profile steel, a C-type steel formed by bending a steel plate, or a steel tube. The tower barrel may be a circular tower barrel. The transition portion may be divided into four pieces or two pieces by the longitudinal flange(s). The inverted T-type flange may be connected to the top of the circular box girder by high-strength bolts.

Embodiment 4

The present embodiment is a wind tower having a prestressed anti-fatigue combined structure, having all the characteristics of the connecting structure of the steel tube truss and the tower barrel of the lattice wind power generation tower. The connecting structure having the steel tube truss and the tower barrel of the lattice wind power generation tower described in Embodiment 1 is also applicable to the present embodiment, and the technical solutions already disclosed in Embodiment 1 are not repeatedly described.

Figure 16:
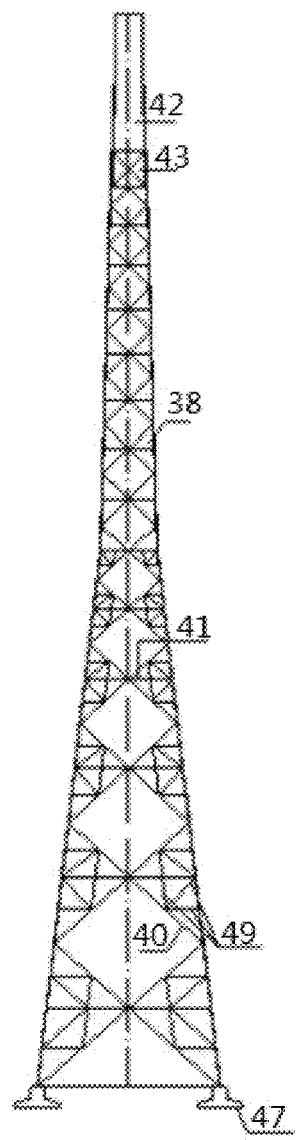
FIG. 16 is a structural schematic view of a wind tower having prestressed anti-fatigue structure provided by an embodiment of the present disclosure.
Figure 17:
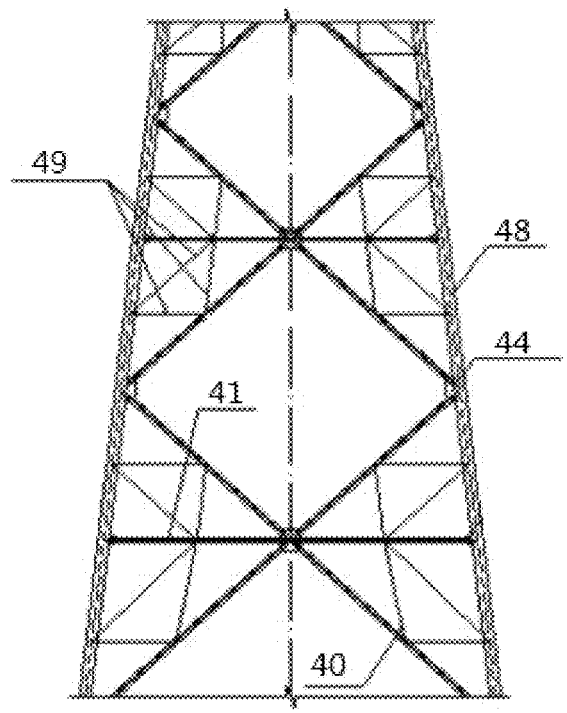
FIG. 17 is a structural schematic view of a framed tower frame.
Figure 18:
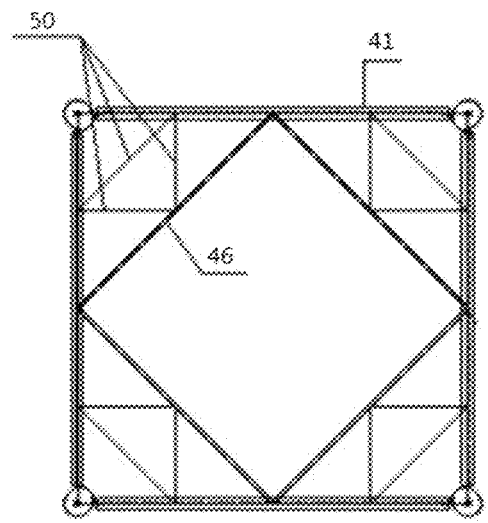
FIG. 18 is a structural schematic view of a cross sill.
Figure 19:
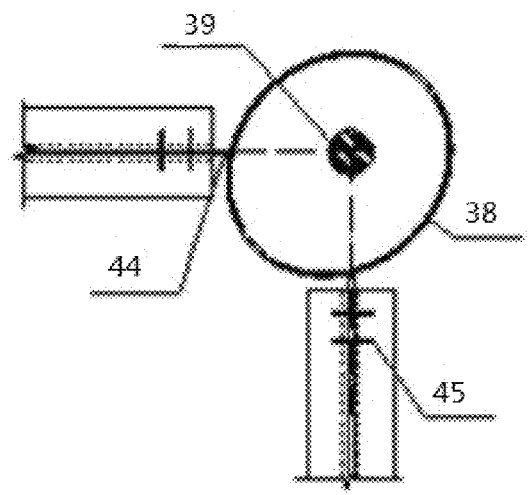
FIG. 19 is a structural schematic view of the joint of a tower pillar.
Figure 20:
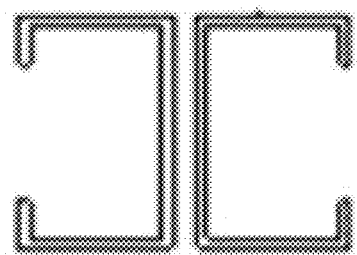
FIG. 20 is a structural schematic view of a double C-type steel cross bar and a double C-type steel diagonal bar.
Figure 21:
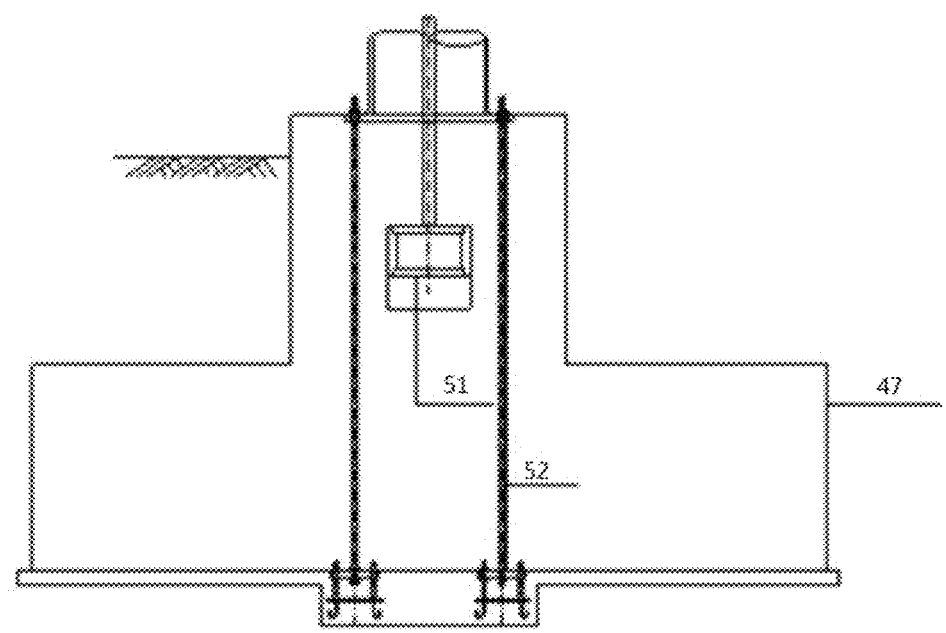
FIG. 21 is a structural schematic view of a base fixing device.

Specifically, the difference between the present embodiment and Embodiment 1 is that the present embodiment is a wind tower having a prestressed anti-fatigue combined structure. Referring to FIG. 16-FIG. 21, a wind tower having a prestressed anti-fatigue combined structure in the present embodiment, as shown in FIG. 16, comprises a tower barrel 42 (similar to the tower barrel 26), a transition structure 43 (similar to the transition portion 35), a framed tower frame 38 (similar to the steel-structure lattice tower body 12) and a base fixing device 47, wherein said tower barrel 42 (similar to the tower barrel 26) is fixed within the transition structure 43 (similar to the transition portion 35), said transition structure 43 (similar to the transition portion 35) is located at the top of the framed tower frame 38 (similar to the steel-structure lattice tower body 12), said framed tower frame 38 (similar to the steel-structure lattice tower body 12) is mounted on the base fixing device 47. As shown in FIG. 19, said framed tower frame 38 (similar to the steel-structure lattice tower body 12) comprises a prestressed steel strand 39 (similar to the prestressed steel strand 30). As shown in FIG. 17, said framed tower frame 38 (similar to the steel-structure lattice tower body 12) further comprises steel tube tower pillars 48 (similar to the prestressed tower pillar 28), double C-type steel diagonal bars 40 (similar to the diagonal bar 33), double C-type steel cross bar 41 (similar to the cross bar 34) and the subdivided web rods 49. As shown in FIG. 18, said framed tower frame 38 (similar to the steel-structure lattice tower body 12) further comprises profile steel cross sills 46 and subdivided cross sills 50. As shown in FIG. 21, and combining FIG. 17, the bottom end of the tower pillar 48 (similar to the prestressed tower pillar 28) is fixed in the base fixing device 47 by a prestressed anchor bolt 52. As shown in FIG. 18, said prestressed steel strand 39 (similar to the prestressed steel strand 30) penetrates from the bottom of the tower pillar to the top thereof. As shown in FIG. 17, the top end of the prestressed steel strand 39 (similar to the prestressed steel strand 30) is tensioned and fixed to the top of the tower pillar 48 (similar to the prestressed tower pillar 28). As shown in FIG. 21, the bottom end of the prestressed steel strand 39 (similar to the prestressed steel strand 30) is anchored in the cable anchor fixation section 51 in the base fixing device 47. As shown in FIG. 17 and combining FIG. 19, said double C-type steel diagonal bar 40 (similar to the diagonal bar 33) is crosswise fixed onto the steel tube tower pillar 48 (similar to the prestressed tower pillar 28) through a gusset plate 44 and a bolt 45 (not shown in FIG. 17), said double C-type steel cross bar 41 (similar to the cross bar 34) is horizontally fixed onto the steel tube tower pillar 48 (similar to the prestressed tower pillar 28) through the gusset plate 44 (not shown in FIG. 18) and the bolt 45. As shown in FIG. 18, said profile steel cross sill 46 is fixed onto the double C-type steel cross bar 41 (similar to the cross bar 34) through the gusset plate 44 and the friction-type high-strength bolt 45. As shown in FIG. 17, a subdivided web rod 49 is mounted between said double C-type steel diagonal bar 40 (similar to the diagonal bar 33) and the double C-type steel cross bar 41 (similar to the cross bar 34). As shown in FIG. 18, a subdivided profile steel cross sill 50 is mounted between said double C-type steel cross bar 41 (similar to the cross bar 34) and the profile steel cross sill 46.

It should be illustrated that, as shown in FIG. 17, the top end of the prestressed steel strand 39 (similar to the prestressed steel strand 30) is tensioned and fixed to the top of the tower pillar 48 (similar to the prestressed tower pillar 28). The aforementioned tension is also known as prestressed tension, which refers to that the tensile force is applied in the member in advance so that the member to which such tensile force is applied is subjected to tensile stress to thereby generate certain deformation to cope with the load received by the structure itself, wherein these loads comprise the load of the own weight of the member, wind load, snow load, seismic load effect, etc. Generally, common members used for applying prestressed tension comprise steel strand, jack, anchor plate, clamping piece.

For the prestressed steel strand 39 in the present disclosure, the pre-compressed stress is applied to the prestressed steel strand 39 in the tensioned module before bearing the external load, so as to improve the resistance to bending and rigidity of the members, delay the time of crack occurrence, and increase the durability of the prestressed steel strand 39. In terms of mechanical structure, its meaning is that the prestressed steel strand 39 is made to generate stress in advance, which has the benefit of being able to improve the rigidity of the prestressed steel strand 39 itself and reduce the vibration and elastic deformation of the prestressed steel strand 39 in use, so as to improve the elastic strength of the tensioned module and make its original resistibility stronger.

Specifically, said diagonal bar 40 (similar to the diagonal bar 33) may be a double C-type steel diagonal bar, said cross bar 41 (similar to the cross bar 34) may be a double C-type steel cross bar, and said cross sill 46 may be a profile steel cross sill, so as to further improve the anti-fatigue ability of the wind tower. Optionally, said tower pillar 48 (similar to the prestressed tower pillar 28) is a steel tube tower pillars. Optionally, said bolt 45 connecting the cross bar 41 (similar to the cross bar 34) and the cross sill 46 is a friction-type high-strength bolt.

It should be illustrated that in all of the embodiments of the present disclosure, only the aforementioned structures of the power generation tower is mainly improved, other functions, parts, and structures, which are not mentioned, when needed, may be implemented with the parts and structures being able to achieve the corresponding functions in the prior art.

The above description is only the preferred embodiments of the present disclosure, and is not intended to limit the present disclosure, for those skilled in the art, various modifications and changes may be made to the present disclosure. Any modifications, equivalent substitutions, improvements and the like made within the spirit and principle of the present disclosure are intended to be included within the protection scope of the present disclosure.

INDUSTRIAL APPLICABILITY

In conclusion, the present disclosure provides a connecting structure for a steel tube truss and a tower barrel of a lattice wind power generation tower, as well as a prestressed polygon wind tower provided with a direct-fan circular box girder on the top of the tower, a wind power generation tower, and a wind tower having a prestressed anti-fatigue structure, which can simplify the connection mode between the tower barrel and the lattice tower frame, resolve the stress problem, enable the force transmission of a transition section to be direct and save materials; adapt to the running space requirement of the blade, simplify the manufacturing and installation steps, reduce costs and increase production efficiency; and prolong fatigue life, and be convenient to construct.

The embodiments of the invention in which an exclusive property or privilege is claimed are defined as follows:

1. A connecting structure for a steel tube truss and a tower barrel of a lattice wind power generation tower, wherein the steel tube truss is connected to the tower barrel through a transition section; said steel tube truss has a plurality of steel tube tower pillars, an upper end portion of each of the steel tube tower pillars is provided with a U-shaped groove, and a barrel wall of the transition section is inserted into the U-shaped grooves and fixedly connected with the steel tube tower pillars by butt welds; a pore remains at a lower end portion of the U-shaped groove; and the barrel wall of the transition section is provided with a semi-circular groove between every two steel tube tower pillars.

2. The connecting structure according to claim 1, wherein said steel tube truss comprises the steel tube tower pillars, cross bars and diagonal bars, number of the steel tube tower pillars is n, the steel tube tower pillars are connected with each other by the cross bars in a horizontal direction and have lateral faces connected by the diagonal bars constituting a steel-structure lattice tower body with a cross section in a shape of n-regular polygon, wherein n is an integer greater than or equal to 4.

3. A prestressed polygon wind tower provided with a direct-fan circular box girder on a top of the tower, wherein said prestressed polygon wind tower comprises the connecting structure according to claim 1, the prestressed polygon wind tower further comprising a steel-structure lattice tower body, a fan-engine-room connection flange and the circular box girder, said circular box girder is connected to a top of the steel-structure lattice tower body, said steel-structure lattice tower body comprises the tower pillars, cross bars and diagonal bars, said tower pillars are each provided therein with a prestressed steel strand, said circular box girder comprises an upper flange of the circular box girder, a web plate of the circular box girder, a lower flange of the circular box girder and a ring-girder bottom flange, the prestressed steel strand inside said tower pillar is anchored on the upper flange of the circular box girder, and said fan-engine-room connection flange is connected with the circular box girder.

4. The prestressed polygon wind tower provided with a direct-fan circular box girder on a top of the tower according to claim 3, wherein said tower pillars are each a steel tube, said cross bars and diagonal bars are made of a profile steel, or a double C-type section steel formed by bending.

5. The prestressed polygon wind tower provided with a direct-fan circular box girder on a top of the tower according to claim 3, wherein said fan-engine-room connection flange is connected to the circular box girder through a first bolt (A) at an inner side of the upper flange of the circular box girder.

6. The prestressed polygon wind tower provided with a direct-fan circular box girder on a top of the tower according to claim 3, wherein a top of said tower pillar is provided with a tower-pillar top flange, said lower flange of the circular box girder is provided with the ring-girder bottom flange, and said tower-pillar top flange is connected to the ring-girder bottom flange through a second bolt (B).

7. A wind power generation tower, comprising the connecting structure according to claim 1, a tower frame and the tower barrel disposed above the tower frame, wherein the tower frame and the tower barrel are connected with each other by a circular box girder.

8. The wind power generation tower according to claim 7, wherein the tower frame comprises prestressed tower pillars, and a bottom of the circular box girder is connected to the prestressed tower pillars through a pillar top flange.

9. The wind power generation tower according to claim 8, wherein a prestressed steel strand is disposed inside and passes through the prestressed tower pillar.

10. The wind power generation tower according to claim 9, wherein the prestressed steel strand passes through the circular box girder and an inverted T-type flange.

11. The wind power generation tower according to claim 10, wherein the inverted T-type flange and the circular box girder are connected with each other by a bolt which passes through the circular box girder.

12. The wind power generation tower according to claim 10, wherein a transition section is connected between the tower barrel and the circular box girder.

13. The wind power generation tower according to claim 12, wherein the transition section is connected to the circular box girder through the inverted T-shaped flange.

14. The wind power generation tower according to claim 13, wherein a bottom of the tower barrel is connected to the transition section through a bottom flange.

15. The wind power generation tower according to claim 12, wherein the transition section is divided into fragments by a longitudinal flange.

16. The wind power generation tower according to claim 8, wherein the tower frame further comprises diagonal bars and cross bars respectively connected to the prestressed tower pillars.

17. A wind tower having a prestressed anti-fatigue structure, comprising the connecting structure according to claim 1, a framed tower frame and a base fixing device, wherein the connecting structure comprises the tower barrel and the transition section, wherein said tower barrel is fixed within the transition section, said transition section is located at a top of the framed tower frame, said framed tower frame is mounted on the base fixing device, wherein said framed tower frame comprises the steel tube tower pillars, prestressed steel strands, diagonal bars, cross bars, cross sills, subdivided web rods and subdivided cross sills, bottom ends of the steel tube tower pillars are fixed in the base fixing device by prestressed anchor bolts, said prestressed steel strands each penetrate from the bottom of one respective steel tube tower pillar to a top of the respective steel tube tower pillar, a top end of each of the prestressed steel strands is tensioned and fixed to the top of the respective steel tube tower pillar, a bottom end of the prestressed steel strand is anchored in a cable anchor fixation section in the base fixing device; said diagonal bars are crosswise fixed to the steel tube tower pillars through gusset plates and bolts, said cross bars are horizontally fixed to the steel tube tower pillars through gusset plates and bolts; said cross sills are fixed to the cross bars through gusset plates and bolts; the subdivided web rods are each installed between one respective diagonal bar and one respective cross bar, and subdivided cross sills are each installed between one respective cross bar and one respective cross sill.

* * * * *